(12) United States Patent
Kim

(10) Patent No.: US 9,200,675 B1
(45) Date of Patent: Dec. 1, 2015

(54) COMPLIANT BEARING

(71) Applicant: Waukesha Bearings Corporation, Pewaukee, WI (US)

(72) Inventor: Jongsoo Kim, West Greenwich, RI (US)

(73) Assignee: WAUKESHA BEARINGS CORPORATION, Pewaukee, WI (US)

( * ) Notice: Subject to any disclaimer, the term of this patent is extended or adjusted under 35 U.S.C. 154(b) by 0 days.

(21) Appl. No.: 14/195,642

(22) Filed: Mar. 3, 2014

Related U.S. Application Data

(63) Continuation of application No. 13/247,804, filed on Sep. 28, 2011, now Pat. No. 8,845,196, which is a continuation-in-part of application No. 12/962,430, filed on Dec. 7, 2010, now abandoned, which is a (Continued)

(51) Int. Cl.
*F16C 17/06* (2006.01)
*F16C 41/00* (2006.01)
*F16C 17/04* (2006.01)
*F16C 19/52* (2006.01)

(52) U.S. Cl.
CPC ............... *F16C 41/00* (2013.01); *F16C 17/045* (2013.01); *F16C 19/522* (2013.01); *F16C 2233/00* (2013.01)

(58) Field of Classification Search
CPC ...... F16C 17/035; F16C 32/06; F16C 17/045; F16C 2233/00; F16C 19/522
See application file for complete search history.

(56) References Cited

U.S. PATENT DOCUMENTS

| 1,349,157 A | 8/1920 | Albert |
| 1,541,411 A | 6/1925 | Davis |
| 2,197,432 A | 4/1940 | Kingsbury |
| 2,744,799 A | 5/1956 | Howarth |
| 2,778,696 A | 1/1957 | Lease |
| 2,834,226 A | 5/1958 | Hirst |
| 2,986,431 A | 5/1961 | Block et al. |

(Continued)

FOREIGN PATENT DOCUMENTS

| CN | 1111327 A | 11/1995 |
| EP | 1927769 A2 | 6/2008 |

(Continued)

OTHER PUBLICATIONS

Ettles, C.; The Development of a Generalized Computer Analysis for Sector Shaped Tilting Pad Thrust Bearing; Tribology.

(Continued)

*Primary Examiner* — Thomas R. Hannon
(74) *Attorney, Agent, or Firm* — Hamilton IP Law, PC; Jay R. Hamilton; Charles A. Damschen

(57) ABSTRACT

A first embodiment of a compliant bearing includes a main body and a bearing surface. The main body and the bearing surface may be engaged with one another via one or more bearing surface springs configured such that the bearing surface is compliant with respect to the main body. A second embodiment of a compliant bearing includes a main body and at least one bearing pad. The main body and the bearing pad may be engaged with one another via one or more pad radial and/or pad axial springs configured such that the bearing pad is compliant with respect to the main body. A sensor web may be integrated into the compliant bearing. In one embodiment the sensor web comprises at least one sensor configured as a strain gauge and affixed to a bearing surface spring.

15 Claims, 9 Drawing Sheets

Related U.S. Application Data continuation of application No. 11/787,146, filed on Apr. 13, 2007, now Pat. No. 7,845,855, said application No. 13/247,804 is a continuation-in-part of application No. 11/998,279, filed on Nov. 29, 2007, now abandoned, and a continuation-in-part of application No. 12/793,983, filed on Jun. 4, 2010, now Pat. No. 8,408,802, and a continuation-in-part of application No. 13/005,997, filed on Jan. 13, 2011, now Pat. No. 8,834,027.

(60) Provisional application No. 61/217,989, filed on Jun. 8, 2009, provisional application No. 61/387,274, filed on Sep. 28, 2010.

(56) References Cited

U.S. PATENT DOCUMENTS

| | | |
|---|---|---|
| 3,160,450 A | 12/1964 | Gentilnomo |
| 3,353,632 A | 11/1967 | Perhach |
| 3,512,854 A | 5/1970 | Harbage |
| 3,837,178 A | 9/1974 | Hackforth et al. |
| 3,859,868 A | 1/1975 | Post |
| 3,909,587 A | 9/1975 | Mattis |
| 4,026,613 A | 5/1977 | Moravchik |
| 4,103,979 A | 8/1978 | Kuhn |
| 4,239,300 A | 12/1980 | Adler |
| 4,288,128 A | 9/1981 | Wells |
| 4,335,925 A | 6/1982 | Stopp |
| 4,421,426 A | 12/1983 | Furukawa |
| 4,456,391 A | 6/1984 | New |
| 4,473,310 A | 9/1984 | Advani et al. |
| 4,515,486 A | 5/1985 | Ide |
| 4,738,550 A | 4/1988 | Gardner |
| 4,793,722 A | 12/1988 | Jensen |
| 5,007,745 A | 4/1991 | Ball et al. |
| 5,012,694 A | 5/1991 | McGrath |
| 5,054,938 A | 10/1991 | Ide |
| 5,068,965 A | 12/1991 | Ball et al. |
| 5,124,605 A | 6/1992 | Bitterly et al. |
| 5,137,373 A | 8/1992 | Ide |
| 5,156,379 A | 10/1992 | Tabata |
| 5,186,077 A | 2/1993 | Nakane |
| 5,205,653 A | 4/1993 | Veronesi et al. |
| 5,352,157 A | 10/1994 | Ochs et al. |
| 5,353,640 A | 10/1994 | Jiang et al. |
| 5,372,431 A | 12/1994 | Ide |
| 5,415,061 A | 5/1995 | Kohno |
| 5,498,082 A | 3/1996 | Nadjafi |
| 5,531,522 A | 7/1996 | Ide et al. |
| 5,549,392 A | 8/1996 | Anderson |
| 5,556,208 A | 9/1996 | Ide |
| 5,567,057 A | 10/1996 | Boller |
| 5,603,574 A | 2/1997 | Ide et al. |
| 5,613,781 A | 3/1997 | Kuzdzal et al. |
| 5,743,654 A | 4/1998 | Ide et al. |
| 5,772,335 A | 6/1998 | Miller |
| 5,795,076 A | 8/1998 | Ball et al. |
| 5,816,114 A | 10/1998 | Gregoire et al. |
| 5,879,085 A | 3/1999 | Ball et al. |
| 5,938,344 A | 8/1999 | Sabin |
| 5,954,480 A | 9/1999 | Schmaling et al. |
| 6,079,102 A | 6/2000 | Miller |
| 6,170,989 B1 | 1/2001 | Zeidan |
| 6,183,138 B1 | 2/2001 | New |
| 6,200,034 B1 | 3/2001 | Miller |
| 6,379,046 B1 | 4/2002 | Zeidaen |
| 6,443,621 B1 | 9/2002 | New |
| 6,499,883 B2 | 12/2002 | Miller |
| 6,565,257 B1 | 5/2003 | Kennedy et al. |
| 6,739,756 B2 | 5/2004 | Miller |
| 6,746,152 B2 | 6/2004 | Branagan |
| 6,766,697 B1 | 7/2004 | Perez et al. |
| 6,767,133 B2 | 7/2004 | New |
| 7,163,368 B2 | 1/2007 | Ide et al. |
| 7,275,872 B2 | 10/2007 | Abrahamian |
| 7,311,445 B2 | 12/2007 | New |
| 7,367,713 B2 | 5/2008 | Swann et al. |
| 7,611,286 B2 | 11/2009 | Swann et al. |
| 7,625,121 B2 | 12/2009 | Pettinato et al. |
| 7,682,084 B2 | 3/2010 | Yoshimura et al. |
| 7,845,855 B2 | 12/2010 | Bischof et al. |
| 8,156,842 B2 | 4/2012 | Movlazada |
| 8,834,027 B2 | 9/2014 | Zeidan |
| 2003/0021503 A1 | 1/2003 | Branagan |
| 2003/0153419 A1 | 8/2003 | Hodjat et al. |
| 2005/0047690 A1 | 3/2005 | Keramati et al. |
| 2006/0078239 A1 | 4/2006 | Dimofte |
| 2008/0131039 A1 | 6/2008 | New |
| 2008/0131042 A1 | 6/2008 | New |
| 2008/0253706 A1 | 10/2008 | Bischof et al. |
| 2009/0268995 A1 | 10/2009 | Ide et al. |
| 2009/0304313 A1 | 12/2009 | Ertas |
| 2010/0310201 A1 | 12/2010 | Zeidan |
| 2011/0188789 A1 | 8/2011 | Bischof et al. |

FOREIGN PATENT DOCUMENTS

| | | |
|---|---|---|
| EP | 2060805 A1 | 5/2009 |
| GB | 1140773 A | 1/1969 |
| GB | 1458660 A | 12/1976 |
| JP | 57000042 A | 1/1982 |
| JP | 60252186 A | 12/1985 |
| JP | 61184805 A | 8/1986 |
| JP | 03149411 A | 6/1991 |
| JP | 6023672 A | 2/1994 |
| JP | 6323505 A | 11/1994 |
| JP | 09303382 A | 11/1997 |
| JP | 11351243 A | 12/1999 |
| JP | 2003232339 A | 8/2003 |
| JP | 2009257445 A | 11/2009 |
| JP | 2010151283 A | 7/2010 |
| KR | 19980040214 A | 8/1998 |
| KR | 1019980040214 A | 8/1998 |
| KR | 20030016246 A | 2/2003 |
| KR | 1020030016246 A | 2/2003 |
| RU | 2038516 C1 | 6/1995 |
| WO | 0177634 A2 | 10/2001 |

OTHER PUBLICATIONS

Chinese Patent Office, Office Action for Waukesha Bearings Corporation Application 201180048964.8, Feb. 3, 2015, with translation and claims.

Chinese Patent Office, Office Action for Waukesha Bearings Corporation Application 201180049047.1, Mar. 31, 2015.

COMPLIANT BEARING

CROSS REFERENCE TO RELATED APPLICATION

This patent application claims priority from and is a continuation of U.S. patent application Ser. No. 13/247,804 filed on Sep. 28, 2011, which application claimed priority from and was a continuation-in-part of U.S. patent application Ser. No. 12/962,430 filed on Dec. 7, 2010, which claimed priority from and was a continuation of U.S. patent application Ser. No. 11/787,146, filed on Apr. 13, 2007, now U.S. Pat. No. 7,845,855; which patent application also claimed priority from and was a continuation-in-part of U.S. patent application Ser. No. 11/998,279 filed on Nov. 29, 2007; which patent application also claimed priority from and was a continuation-in-part of U.S. patent application Ser. No. 12/793,983 filed on Jun. 4, 2010, which claimed priority from provisional U.S. Pat. App. No. 61/217,989 filed on Jun. 8, 2009; which patent application also claimed priority from and was a continuation-in-part of U.S. patent application Ser. No. 13/005,997 filed on Jan. 13, 2011, which claimed priority from provisional U.S. Pat. App. No. 61/387,274 filed on Sep. 28, 2010, all of which are incorporated by reference herein in their entireties.

FIELD OF INVENTION

The present invention relates to bearings, and more specifically, compliant bearings and sensor webs for use therewith.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

BACKGROUND OF THE INVENTION

Rotational bearings are very well known in the art to provide an interface between a rotating structure and a contact surface. It is common to employ some type of pad or pads at the interface to optimize the interconnection between the bearing and the rotating structure and to transmit axial and/or radial forces, which may be accomplished through providing compliance within the bearing in those respective directions.

Load capacity is highly dependent on the pad interface in a bearing. It has been found that the interface may be optimized for better transmission of axial thrust forces by tilting the pads of a bearing or otherwise providing a compliant contact to reduce the amount of friction. Such increasing load capacity by reduced friction may be achieved by controlled hydroplaning. Typically, compliant arrangements include an array of fixed pads that are all tilted in a given rotational direction, such as a forward rotational direction. This is advantageous in that hydroplaning may be achieved.

In the prior art, it is well know that the very low viscosity of gas lubricant causes a gas thrust bearing to run at very thin film thickness to support thrust load generated in the rotating machines. However, a known drawback is that any misalignments or geometrical tolerances (such as warping) of rotating shaft collar and/or bearing surface negatively impacts the thrust load capability of the bearing. This runs counter to the continual desire to increase load capacity of the bearing. Further, any thermal distortion or deflection of the shaft collar and/or \bearing surface during operation is another factor that influences the thrust load capability of the bearing.

A spiral grooved thrust bearing typically has the best load capability among all hydrodynamic gas thrust bearings. However, the fact that negative damping may be generated at certain operating conditions (combination of speed and thrust load) is a major drawback of such spiral groove thrust bearings. This behavior of spiral grooved gas thrust bearings is another factor that undesirably limits load capacity of a bearing.

There is a need for a compliant bearing with increased load capacity.

There is a need for a thrust bearing with axial compliance.

There is a need for a compliant bearing with axial damping.

There is a need for a compliant bearing that is more stable than prior art compliant bearings.

There is a need for a thrust bearing with some type of axial compliance to help maintain a proper film thickness by allowing deformation and/or tilt of compliant bearing surface as need of rotating runner surface.

There is a need to provide axial compliance of a thrust bearing to increase the overall load capacity of the bearing.

There is a need to monitor the performance and/or operating conditions on any compliant bearing, radial, axial, or otherwise.

BRIEF DESCRIPTION OF THE DRAWINGS

In order that the advantages of the invention will be readily understood, a more particular description of the invention briefly described above will be rendered by reference to specific preferred embodiments illustrated in the appended drawings. Understanding that these drawings depict only typical embodiments of the invention and are not therefore to be considered limited of its scope, the invention will be described and explained with additional specificity and detail through the use of the accompanying drawings.

Figure 1:
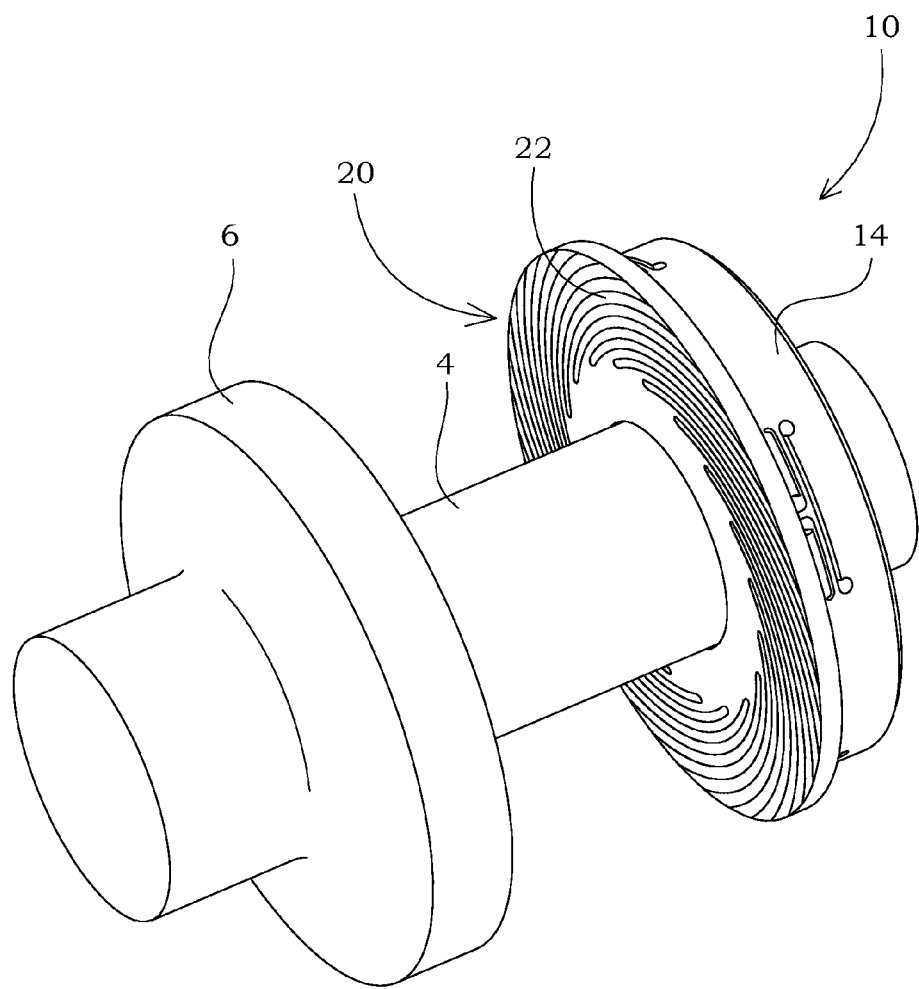
FIG. 1 provides an exploded perspective view of a first embodiment of a compliant bearing and a shaft and shaft collar, wherein the compliant bearing is configured as a groove thrust bearing.

| DETAILED DESCRIPTION—LISTING OF ELEMENTS | |
|---|---|
| ELEMENT DESCRIPTION | ELEMENT # |
| Shaft | 4 |
| Shaft collar | 6 |
| Groove thrust bearing | 10 |
| Pad thrust bearing | 12 |
| Main body | 14 |
| Multi-compliant bearing | 16 |
| Bearing surface | 20 |
| Groove pattern | 22 |
| First bearing surface spring | 24 |
| Second bearing surface spring | 26 |
| Interstitial area | 28 |
| Damping material | 29 |
| Bearing pad | 30 |
| Bearing pad interface | 32 |
| Pad radial spring | 34 |
| Pad axial spring | 36 |
| Interstitial area | 38 |
| Bearing pad | 30' |
| Bearing pad interface | 32' |
| Post | 34' |
| Post base | 34a' |
| Sensor web | 40 |
| First sensor | 42 |
| Second sensor | 42a |
| Third sensor | 42b |
| Fourth sensor | 42c |

DETAILED DESCRIPTION

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

Referring now to the drawings, wherein like reference numerals designate identical or corresponding parts throughout the several views, FIG. 1 provides an exploded view of a first embodiment of a compliant bearing configured as a groove thrust bearing 10. The bearing surface 20 of the groove thrust bearing 10 is show separated from a shaft collar 6, which shaft collar 6 is typically affixed to a rotatable shaft 4 as shown in FIG. 1. In operation, the shaft collar 6 is typically located very close to the bearing surface 20, separated therefrom by only a thin layer of lubricant, which lubricant may be gas, fluid, or other suitable lubricant. The illustrative embodiment of the groove thrust bearing 10 includes a main body 14, which is typically fixedly mounted to a support (not shown) during operation.

Figure 1A:
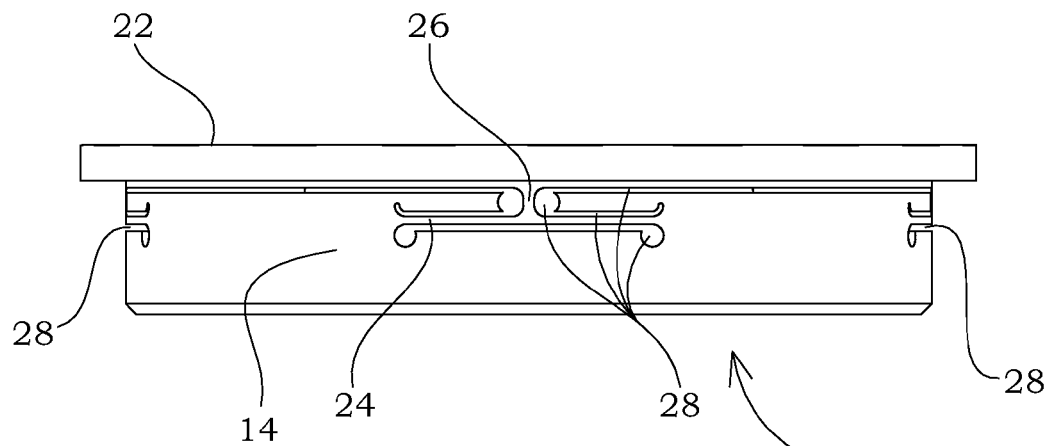
FIG. 1A provides a side view of the embodiment of the compliant bearing shown in FIG. 1.
Figure 1B:
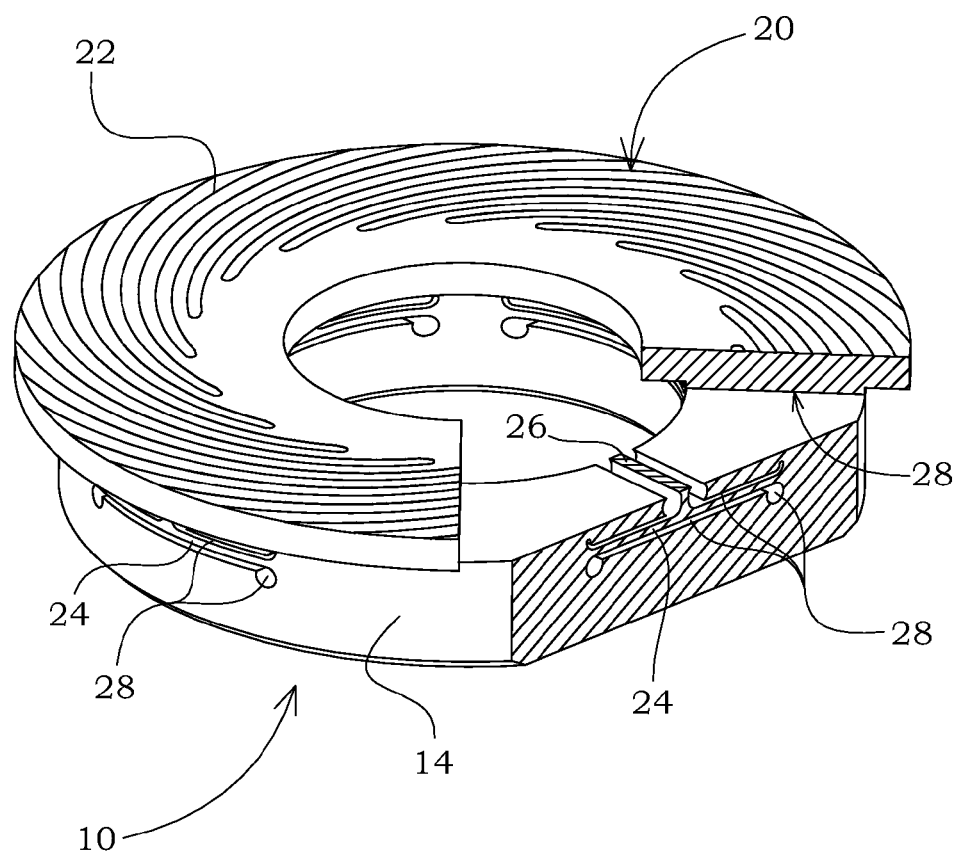
FIG. 1B provides a cross-sectional view of the embodiment of the compliant bearing shown in FIG. 1.

The embodiment of the groove thrust bearing 10 shown in FIGS. 1-1B includes a groove pattern 22 formed in the bearing surface 20. The pictured embodiment shows a groove pattern 22 configured as a spiral groove pattern 22. Other embodiments of the groove thrust bearing may have other groove patterns 22 without departing from the spirit and scope of the compliant bearing as disclosed and claimed herein.

The illustrative embodiment of a groove thrust bearing 10 is shown from a side vantage in FIG. 1A, and FIG. 1B provides a cross-sectional view thereof. The groove thrust bearing 10 may be formed with at least one bearing surface spring 24, 26 cooperatively engaging the main body 14 with the bearing surface 20. The illustrative embodiment includes a first bearing surface spring 24 oriented perpendicular to the rotational axis of the shaft 4 and a second bearing surface spring 26 oriented parallel to the rotational axis of the shaft 4. The first and second bearing surface springs 24, 26 may be integrally formed with one another, and/or integrally formed with the main body 14 and/or bearing surface.

Generally, the groove thrust bearing 10 disclosed herein provides axial compliant via the bearing surface springs 24, 26. This compliancy of the bearing surface allows the groove thrust bearing 10 to maintain a proper film thickness under a variety of conditions under which prior art bearings would fail. The groove thrust bearing 10 accomplishes this by allowing deformation and/or tilt of bearing surface 20 as needed based on perturbations from the shaft collar 6, groove thrust bearing 10, and/or lubricant.

The illustrative embodiment of a groove thrust bearing 10 shown herein utilizes four first bearing surface springs 24 and four second bearing surface springs 26, wherein each first bearing surface spring 24 is generally perpendicular with respect to each second bearing surface spring 26. However, other embodiments of the compliant bearing may use other numbers of first and second bearing surface springs 24, 26 (and associated elements) in different configurations and/or orientations without limitation.

As best shown in FIGS. 1A & 1B, the illustrative embodiment of a groove thrust bearing 10 includes a plurality of interstitial areas 28 to allow for a predetermined amount of motion of the bearing surface 20 and first and second bearing surface springs 24, 26 with respect to the main body 14. The illustrative embodiment includes a first interstitial area 28 between the bottom surface of the first bearing surface spring 24 and the main body 14, wherein either end of the first interstitial area 28 is formed with a generally circular cross-sectional shape. A second interstitial area 28 may be formed between the top surface of the first bearing surface spring 24 and the main body 14. The second interstitial area 28 may be interconnected with a third interstitial area 28 between the second bearing surface spring 26 and the main body 14, such that a portion of the main body 14 is cantilevered over a portion of the first bearing surface spring 24. Finally, a fourth interstitial area 28 may be formed between the bearing surface 20 and main body 14 opposite the groove pattern 22, as best shown in FIG. 1A.

The illustrative embodiment of the groove thrust bearing 10 having a spiral groove pattern 22 is known to have the best load capability among all hydrodynamic gas compliant bearings. However, a drawback of such compliant bearings is the potential to generate a negative damping at certain operating conditions (combination of speed and compliant load). The axial compliancy from the first and second bearing surface springs 24, 26 in cooperation with damping material 29 in certain interstitial areas 28 mitigates and in some cases eliminates any instability from negative damping by creating a positive resultant damping. This leads to increased load capacity compared to spiral groove bearings of the prior art.

Figure 4:
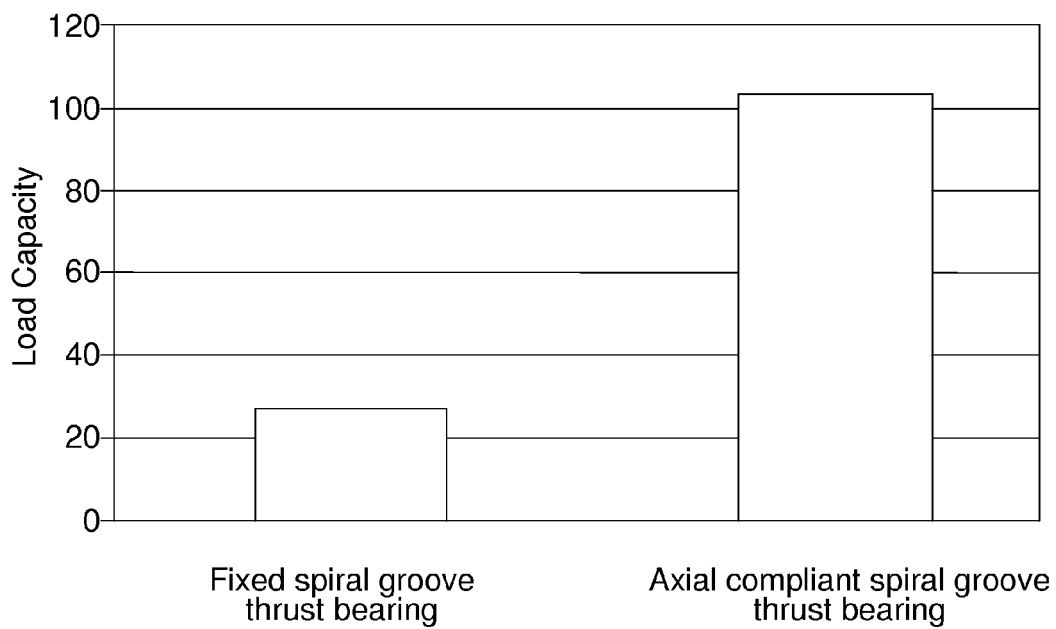
FIG. 4 provides a graph comparing the increased load capacity of the compliant bearing with that of prior art bearings.

A chart comparing the load capacity (in pounds) between prior art non-compliant spiral groove bearings and the illustrative embodiment of the groove thrust bearing 10 disclosed herein is shown in FIG. 4. As is readily apparent from FIG. 4, a prior art bearing may have a load capacity of less than 30 (thirty) pounds, while a comparable compliant bearing with integrated damping capability may achieve axial thrust loads in excess of 100 (one hundred) pounds. Additionally, through testing it has been determined that lower compliant capacity may result from misalignment of the shaft collar 6 and bearing surface 20 (or bearing pad interface 32), or if the shaft collar 6 operates at the threshold film thickness of negative damping. The compliant bearing as disclosed herein addresses such problems regarding static and/or dynamic misalignment/perturbation/distortion.

Figure 2:
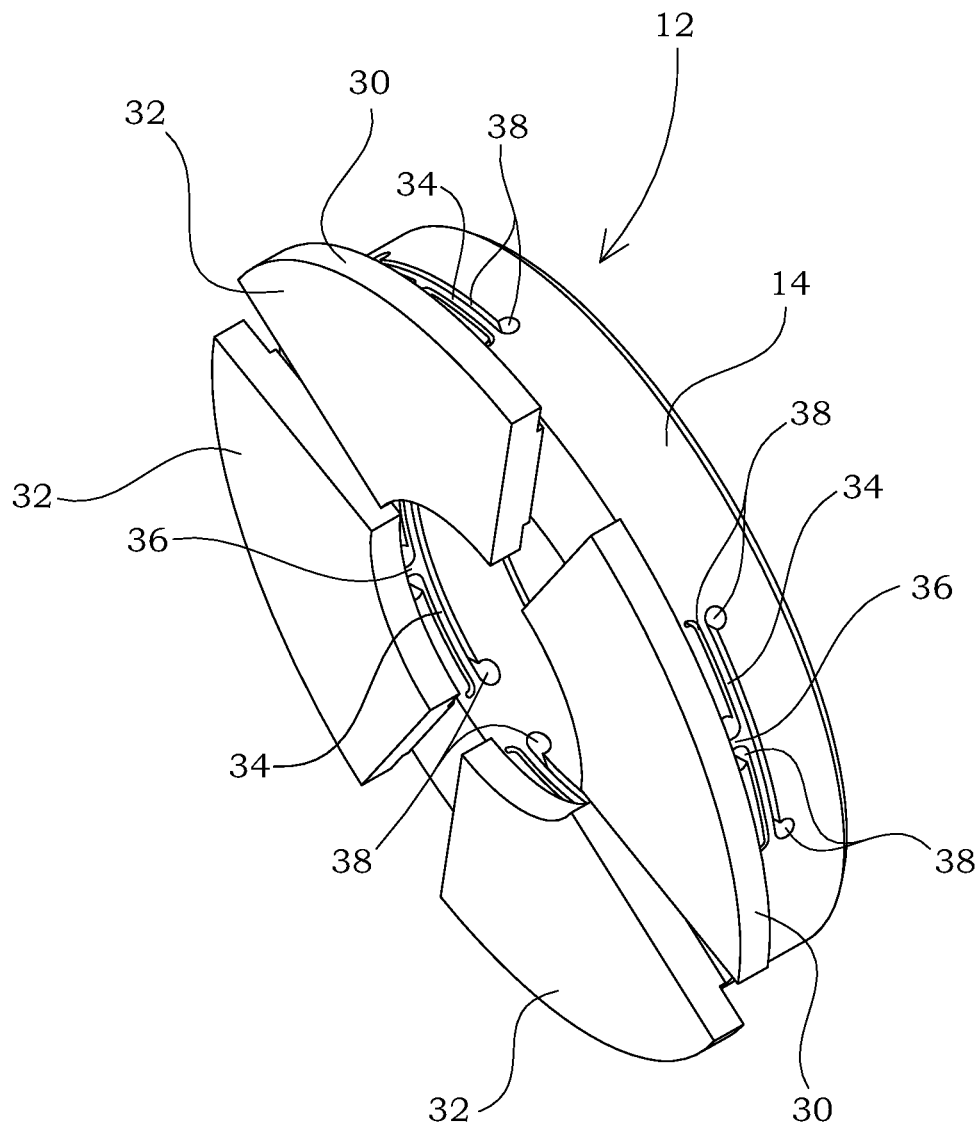
FIG. 2 provides a perspective view of a second embodiment of the compliant bearing, wherein the compliant bearing is configured as a pad thrust bearing.
Figure 3:
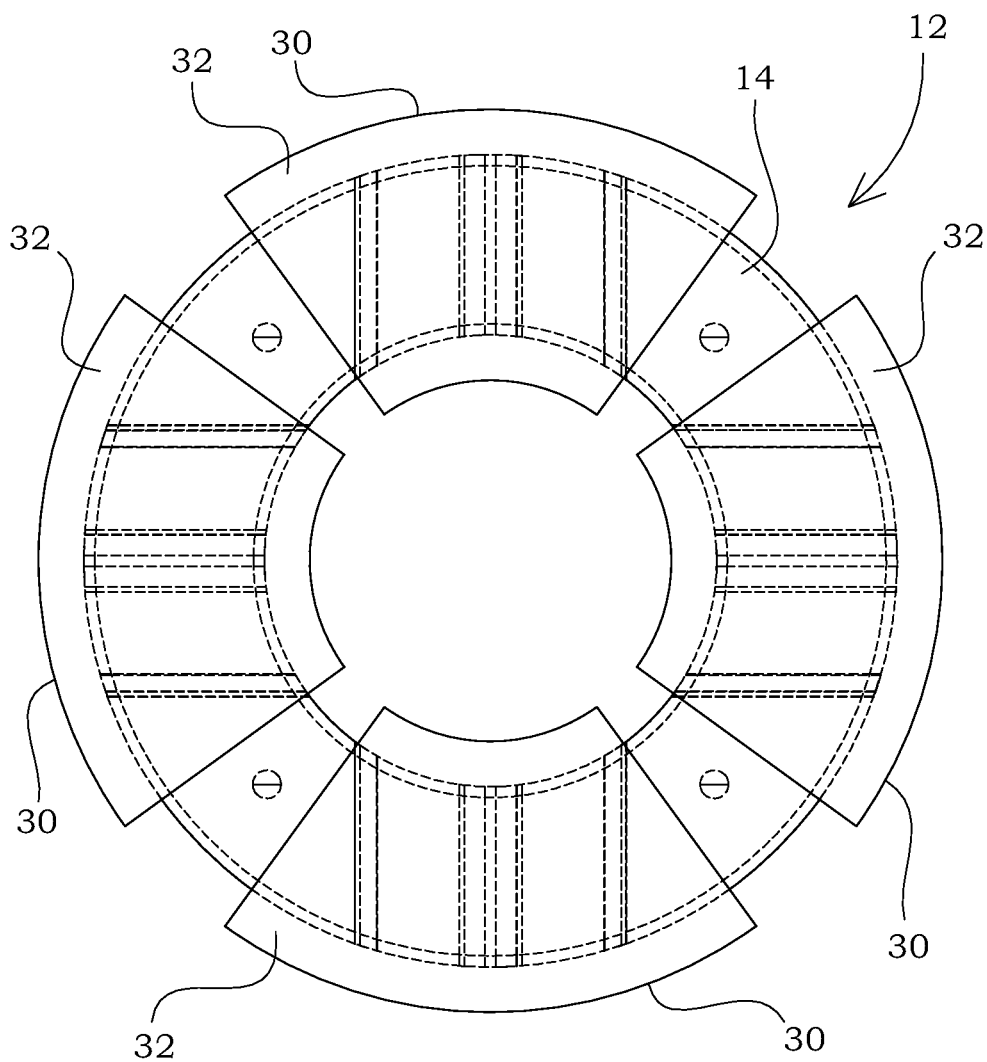
FIG. 3 provides an axial view of the second embodiment of the compliant bearing.
Figure 3A:
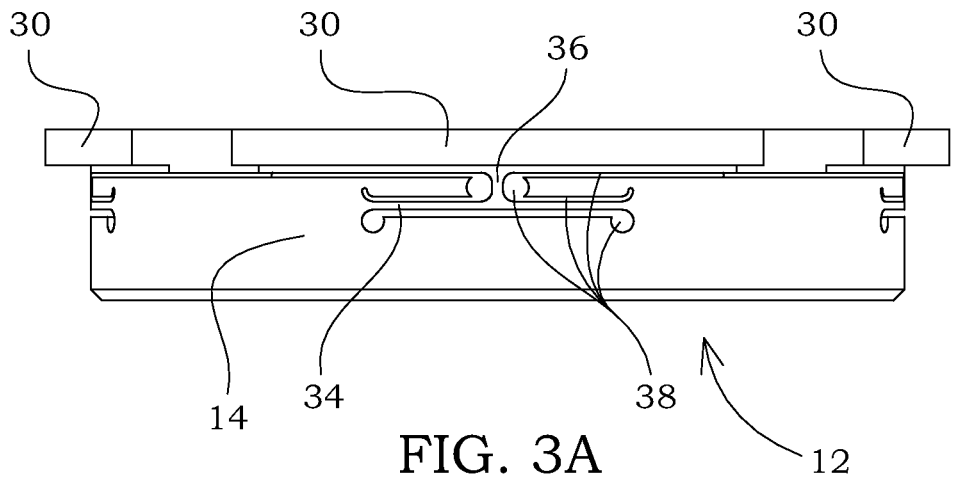
FIG. 3A provides a side view of the second embodiment of the compliant bearing.
Figure 3B:
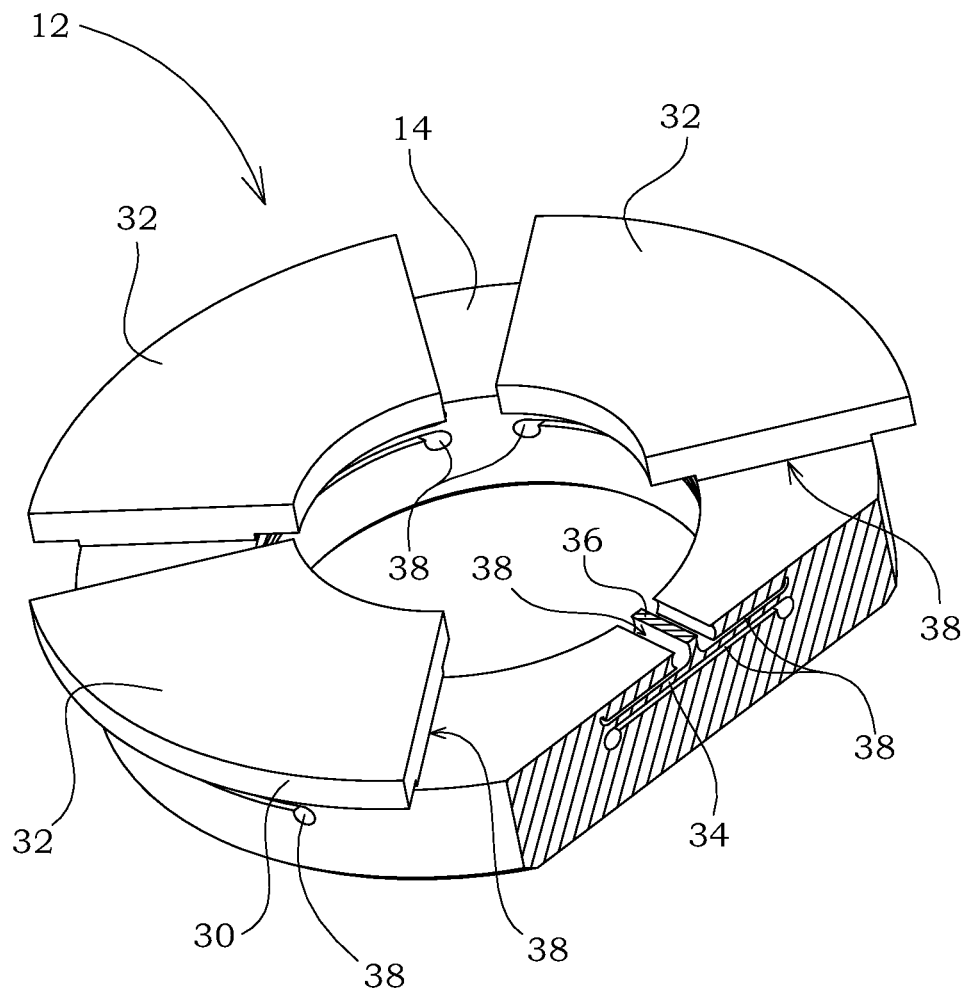
FIG. 3B provides a cross-sectional view of the second embodiment of the compliant bearing.

A second embodiment of a compliant bearing configured as a pad thrust bearing 12 is shown in FIGS. 2-3B. The illustrative embodiment includes four bearing pads 30 equally spaced about the main body 14 of the pad thrust bearing 12, as best shown in FIG. 3, which provides an axial view of the bearing pad interface 32 of each bearing pad 30 for the second embodiment of a compliant bearing.

The bearing pads 30 in the second embodiment of a compliant bearing are generally trapezoidal in shape, with the base and top edges being arcuate rather than linear. However, the bearing pads 30 may have any shape and/or configuration, and the scope of the compliant bearing as disclosed and claimed herein is in no way limited thereby. Additionally, the second embodiment of a compliant bearing utilizes four bearing pads 30 are used, and consequently, four pad radial springs 34 and four pad axial springs 36 are used. However, other embodiments of the compliant bearing may use other numbers of bearing pads 30 (and associated elements) without limitation.

As best shown in FIGS. 3A & 3B, as a corollary to the illustrative embodiment of the groove thrust bearing 10, the illustrative embodiment of a pad thrust bearing 12 includes a plurality of interstitial areas 38 to allow for a predetermined amount of motion of the bearing pads 30 and pad radial and axial springs 34, 36 with respect to the main body 14. The illustrative embodiment includes a first interstitial area 38 between the bottom surface of the pad radial spring 34 and the main body 14, wherein either end of the first interstitial area 38 is formed with a generally circular cross-sectional shape. A second interstitial area 38 may be formed between the top surface of the pad radial spring 34 and the main body 14. The second interstitial area 38 may be interconnected with a third interstitial area 38 between the pad axial spring 36 and the main body 14, such that a portion of the main body 14 is cantilevered over a portion of the pad radial spring 34. Finally, a fourth interstitial area 28 may be formed between the bearing pad 30 and main body 14 opposite the bearing pad interface, as best shown in FIG. 3A.

The optimal amount of compliancy will vary from one application to the next, and is therefore in no way limiting to the scope of any compliant bearing disclosed herein. Additionally, the configuration of the bearing surface springs 24, 26, pad radial spring 34, pad axial spring, interstitial areas 28, 38, and/or any damping material 29, 39 may be configured and/or oriented differently than as shown in the illustrative embodiments without departing from the spirit and scope of the compliant bearing as disclosed and claimed herein. Such alternative configurations and/or orientations may be required to achieve the optimal amount of compliancy for a given application.

The desired features for a specific compliant bearing may be achieved within a very short axial length by utilizing an EDM (Electrical Discharge Machine) technique. It is contemplated that the springs 24, 26, 34, 36 will typically be configured in pairs, which configuration is most compatible with the wire EDM cutting process through the main body 14 of the compliant bearing. In such a cutting process, two springs 24, 26, 34, 36 may be cut simultaneously due to the symmetry of the compliant bearing about it axial face. For example, as seen in FIG. 2, a total of four pairs of springs 34, 36 may be formed via two wire EDM cutting operations. It is also contemplated that the compliant bearings disclosed and claimed herein may be manufactured using alternative materials, such as polymers, plastics, other synthetic materials, and/or combinations thereof, certain of which may use injection molding or thermoforming.

The compliance feature of the groove thrust bearing 10 and pad thrust bearing 12 as disclosed herein as illustrative embodiments of a compliant bearing (which compliancy is provided by the first and second bearing surface springs 24, 26 and pad radial and axial springs 34, 36, respectively) may be implemented on any compliant bearings (e.g., spiral groove thrust bearing, conventional or flexure pivot tilt pad bearing, radially compliant bearing, etc.). Also, other types of springs 24, 26, 34, 36 other than leaf springs (such as those shown in the embodiments pictured herein) may be used with the compliant bearings disclosed and claimed herein to achieve the desired level of axial and/or radial compliancy.

Figure 1C:
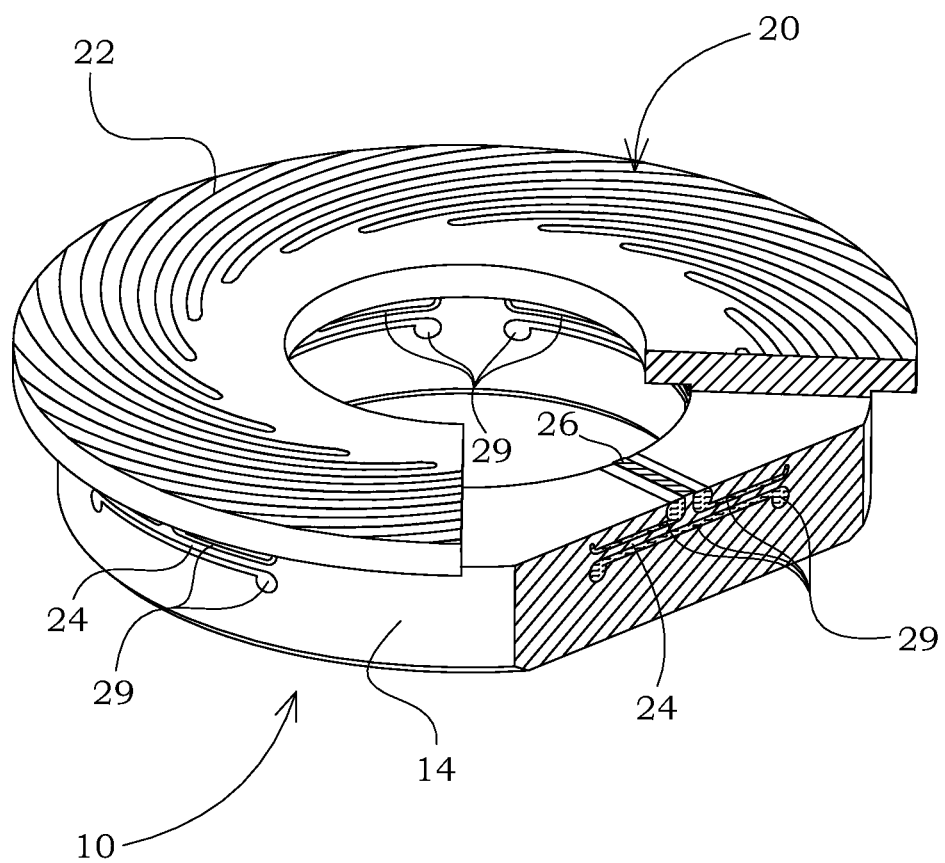
FIG. 1C provides a cross-sectional view of the embodiment of the compliant bearing shown in FIG. 1, wherein damping material has been added to the interstitial areas.

In any embodiment of a compliant bearing, including but not limited to the illustrative embodiments of a groove thrust bearing 10 and pad thrust bearing 12 as disclosed herein, the compliant bearing may be configured with integrated damping capabilities. For example, as seen in FIG. 1C, a damping material 29 (e.g., a rubber, silicone, polymer material, etc.) may be positioned into various interstitial areas 28. Additionally, although not shown, radial compliant bearings and/or other axially compliant bearings (such as a pad thrust bearing 12) may be configured with integrated damping capabilities.

Any embodiment of a compliant bearing (including but not limited to a radially compliant bearing and the illustrative embodiments of a groove and pad thrust bearing 10, 12 shown herein), a sensor web 40 may be engaged with the compliancy members. Although the compliancy members for the illustrative embodiments of the groove thrust bearing 10 and pad thrust bearing 12 are shown herein as various springs 24, 26, 34, 36, FIGS. 5-5B show another embodiment of a compliant bearing configured as a multi-compliant bearing 16 wherein the compliancy members are configured as posts 34'.

Figure 5:
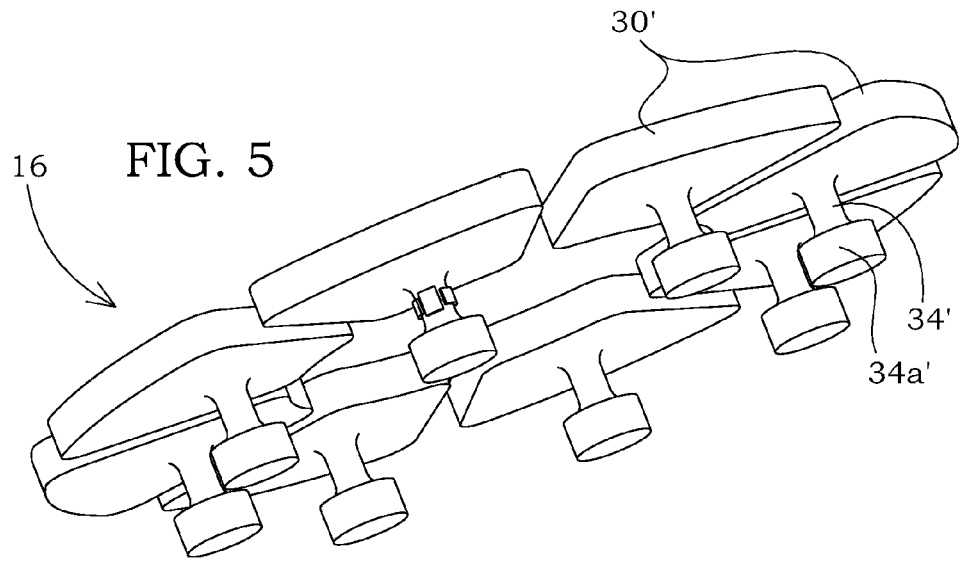
FIG. 5 provides a perspective view of a third embodiment of a compliant bearing with a sensor web configured for use therewith, wherein the compliant bearing is configured as a multi-compliant bearing.

FIG. 5 provides a perspective view of a plurality of bearing pads 30' that may be used with the third embodiment of a compliant bearing. The bearing pads 30' may include a post 34' opposite the bearing pad interface 32', which post 34' may be integrally formed with the bearing pad 32'. The posts 34' may terminate at a post base 34a' opposite the bearing pad interface 32'. The post base 34a' may cooperate with a main body to secure the bearing pads 30' in relative special relation to one another within a predetermined amount of allowed movement.

Figure 5A:
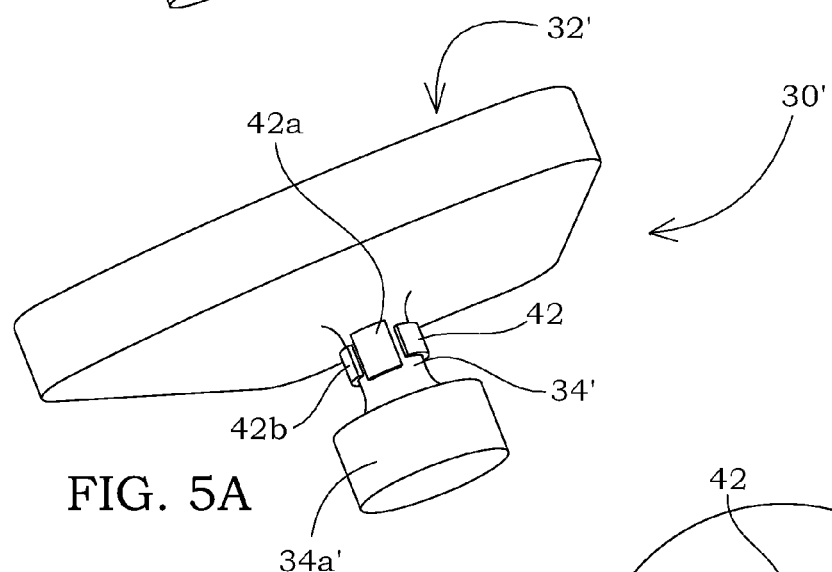
FIG. 5A provides a detailed perspective view of one embodiment of a bearing pad that may be used with the third embodiment of compliant bearing.
Figure 5B:
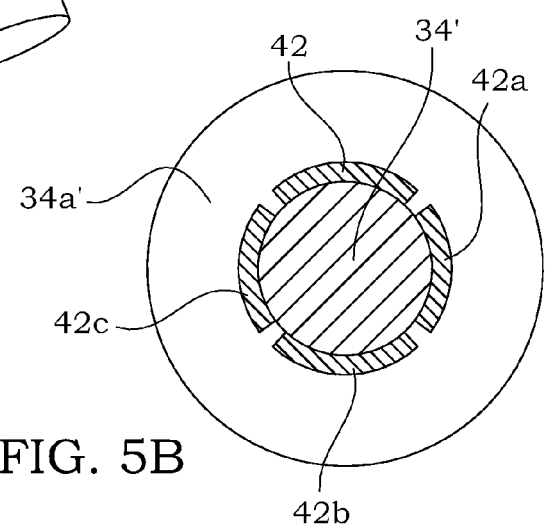
FIG. 5B provides a cross-sectional view of one embodiment of a post that may be used with the embodiment of a bearing pad shown in FIG. 5A.

As shown in detail in FIGS. 5A & 5B, sensors 42, 42a, 42b, 42c may be secured to the post 34' such that various forces experiences by the post 34' (and consequently, various forces experiences by the bearing pad 30') may be detected, and subsequently monitored and/or recorded. It is contemplated that the sensors 42, 42a, 42b, 42c may be configured as strain gauges, and more specifically, electric strain gauges. However, any suitable sensor 42, 42a, 42b, 42c may be used, and the optimal sensor 42, 42a, 42b, 42c will vary from one application to the next.

Figure 6:
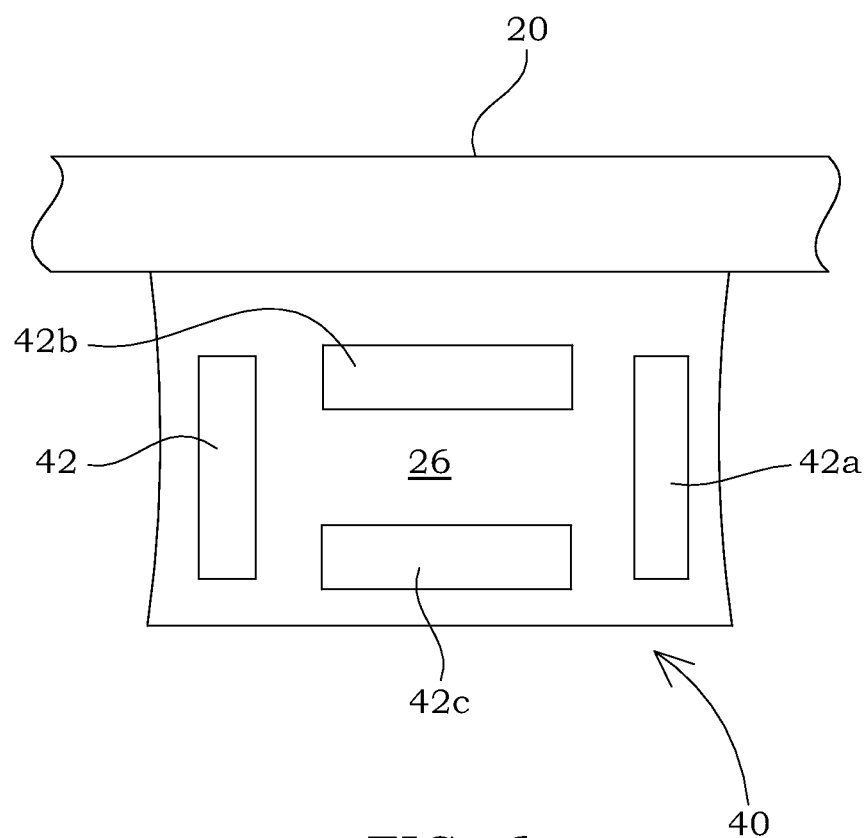
FIG. 6 provides a detailed view of one embodiment of a compliant bearing incorporating one embodiment of a sensor web.

Another embodiment of a sensor web 40 is shown in FIG. 6 as employed with the illustrative embodiment of the groove thrust bearing 10. Here, four sensors 42, 42a, 42c, 42c are shown affixed to a second bearing surface spring 26, wherein the first and second sensors 42, 42a are configured to detect deflection in the vertical direction (from the vantage shown in FIG. 6) and the second and third sensors 42b, 42c are configured to detect deflection in the horizontal direction (from the vantage shown in FIG. 6). Such a sensor web 40 may also be employed on any other spring 24, 34, 36 or other compliancy member of compliant bearings. In this configuration, the readings from the first and second sensors 42, 42a and third and fourth sensors 42b, 42c, respectively, may be averaged or manipulated via an electric device. In other embodiments the sensor web 40 may be differently configured and/or configured to detect changes other than those of deflection, such as slope or other variables and/or parameters.

It is contemplated that the various sensors 42 in any given sensor web 40 may be configured to generate a data stream from data points created at specific intervals (e.g., time intervals). This data stream may be recorded and/or displayed in real time to a user who may then adjust the configuration of the compliant bearing to with which the sensor web 40 is employed, and/or adjust the operating parameters of the system with which the compliant bearing is utilized. Accordingly, the sensor web 40 may be beneficial in failure analysis of a compliant bearing and/or predicting failure or other various operating parameters of a compliant bearing. Such a sensor web 40 employed with an axial compliant bearing (such as a groove thrust bearing 10 or pad thrust bearing 12) may detect thrust load upon the bearing during rotation of the shaft 4 in either direction and/or start up thrust load during no rotation. Additionally, a sensor web 40 configured to measure mechanical deformation may be especially useful in determining the thrust force of various types of rotating equipment, including but not limited to turbo machinery.

The optimal dimensions and/or configuration of the main body 14, bearing surface 20, springs 24, 26, 34, 36, bearing pad 30, 30', post 30', post base 34a', and sensor web 40 will vary from one embodiment of the compliant bearing to the next, and are therefore in no way limiting to the scope thereof. The various elements of the compliant bearing may be formed of any material that is suitable for the application for which the compliant bearing is used. Such materials include but are not limited to metals and their metal alloys, polymeric materials, and/or combinations thereof.

Although the specific embodiments pictured and described herein pertain to a compliant bearing having four or eight or ten bearing pads 30, 30', four first and second bearing surface springs 24, 26, and four pad radial and axial springs 34, 36, the compliant bearing may be configured with other orientations and/or with different quantities of the various elements having different shapes and/or orientations. Accordingly, the scope of the compliant bearing is in no way limited by the specific shape and/or dimensions of the main body 14, bearing surface 20, springs 24, 26, 34, 36, interstitial areas 28, 38, bearing pads 30, 30', posts 34', and/or post bases 34a' or the relative quantities and/or positions thereof.

Having described the preferred embodiments, other features, advantages, and/or efficiencies of the compliant bearing will undoubtedly occur to those versed in the art, as will numerous modifications and alterations of the disclosed embodiments and methods, all of which may be achieved without departing from the spirit and scope of the compliant bearing as disclosed and claimed herein. It should be noted that the compliant bearing is not limited to the specific embodiments pictured and described herein, but are intended to apply to all similar apparatuses for providing compliancy in a bearing, measuring parameters of a compliant bearing, and/or methods thereof. Modifications and alterations from the described embodiments will occur to those skilled in the art without departure from the spirit and scope of compliant bearing.

The invention claimed is:

1. A sensor web comprising:
   a. a first sensor positioned on a first spring of a compliant bearing, wherein said first sensor is configured to measure a force placed on said first spring, wherein said force is in a first direction; and
   b. a second sensor positioned on a second spring of said compliant bearing, wherein said second sensor is configured to measure a force placed on said second spring, wherein said force on said second spring is in a second direction.

2. The sensor web according to claim 1 wherein said first direction and said second direction are further defined as being perpendicular with respect to one another.

3. The sensor web according to claim 1 wherein said first direction and said second direction are further defined as being parallel with respect to one another.

4. A compliant bearing comprising:
   a. a first bearing pad, said first bearing pad comprising:
      i. a post terminating at a post base;
      ii. a bearing pad interface engaged with said post;
   b. a second bearing pad positioned adjacent said first bearing pad, said second bearing pad comprising:
      i. a post terminating at a post base;
      ii. a bearing pad interface engaged with said post;
   c. a sensor web comprising a first sensor positioned on said post of said first bearing pad, wherein said first sensor is configured to measure a force placed on said post of said first bearing pad.

5. The complaint bearing according to claim 4 further comprising a second sensor positioned on said post of said second bearing pad of said compliant bearing, wherein said second sensor is configured to measure a force placed on said post of said second bearing pad.

6. The compliant bearing according to claim 5 wherein said second force is further defined as having a direction that is generally parallel to said direction of said first force.

7. The compliant bearing according to claim 5 wherein said first and second sensors are further defined as being generally perpendicular to one another.

8. The compliant bearing according to claim 5 wherein said first and second sensors are further defined as being generally parallel to one another.

9. The compliant bearing according to claim 5 further comprising a third and a fourth sensor, wherein said third and fourth sensors are positioned on said post of said first bearing pad.

10. The compliant bearing according to claim 9 wherein said third sensor is further defined as being generally parallel with respect to said first sensor.

11. The compliant bearing according to claim 10 wherein said fourth sensor is further defined as being generally perpendicular with respect to said second sensor.

12. The compliant bearing according to claim 11 wherein said first, third, and fourth sensors are further defined as being configured to detect and measure a force experience by said post of said first bearing pad.

13. The compliant bearing according to claim 4 wherein said force is further defined as being a dynamic force.

14. The compliant bearing according to claim 4 wherein said force is further defined as having a direction that may cause said first post to bend along a length of said first post.

15. A method for monitoring a compliant bearing, said method comprising the steps of:
   a. placing a first sensor on a first spring of said compliant bearing, wherein said first sensor is oriented in a first direction;
   b. placing a second sensor on a second spring of said compliant bearing, wherein said second sensor is oriented in a second direction;
   c. monitoring a data stream from said first sensor and said second sensor;
   d. analyzing said data stream; and
   e. adjusting the configuration of said compliant bearing based on the analysis of said data stream.

* * * * *